Patented Jan. 23, 1923.

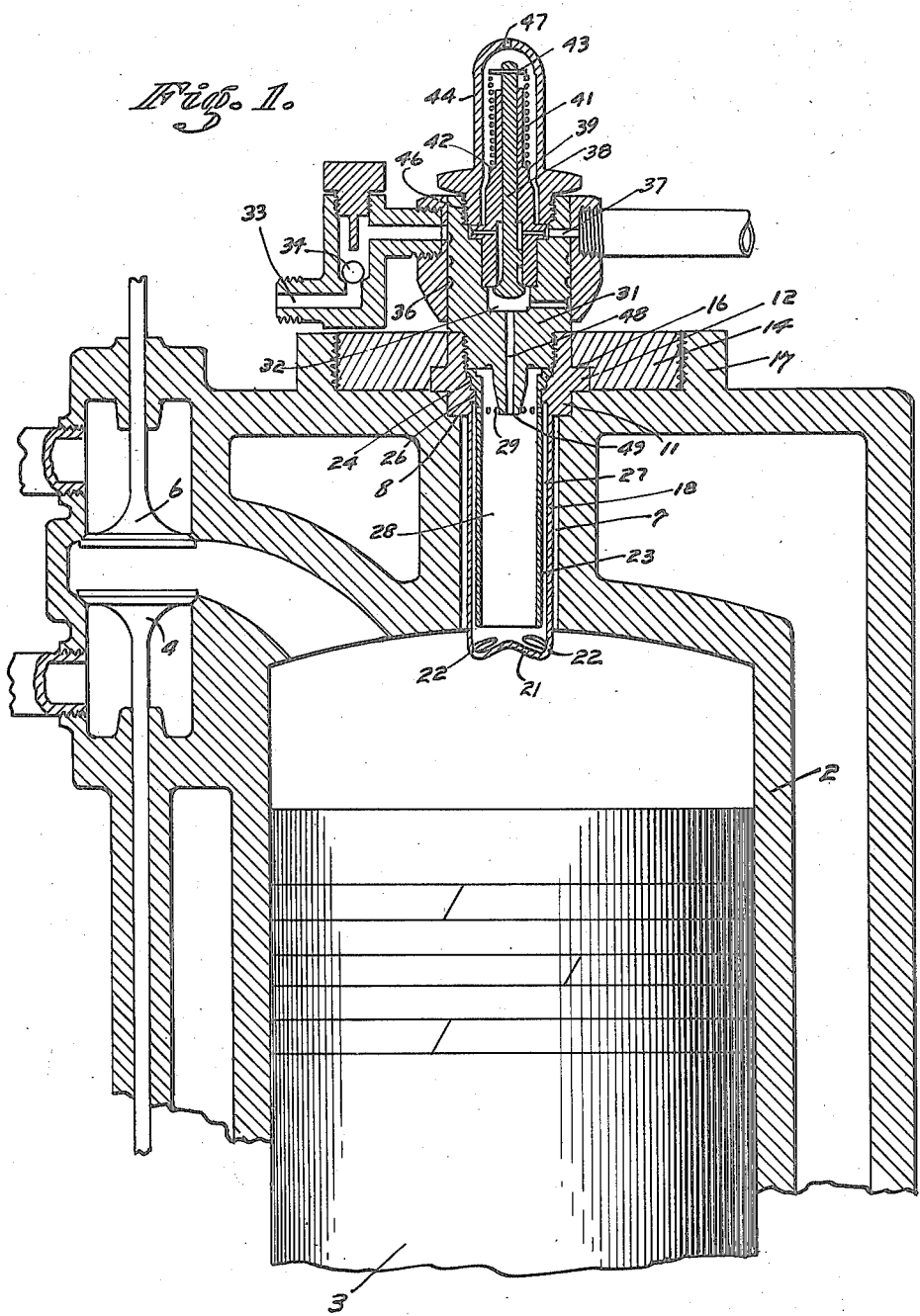

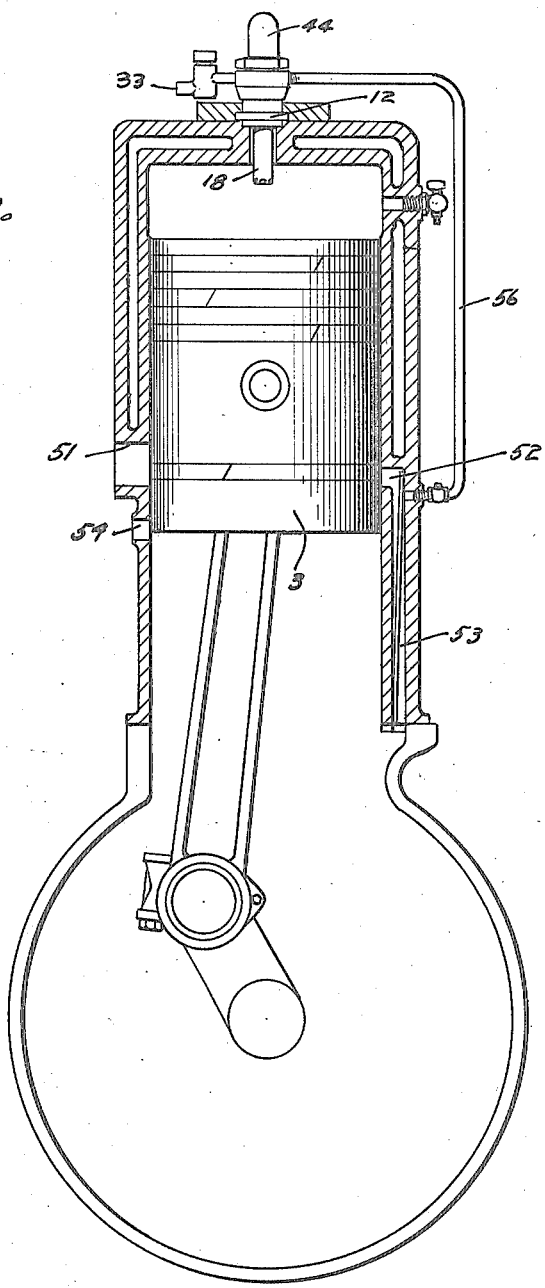

1,443,187

UNITED STATES PATENT OFFICE.

EDWARD L. LOWE, OF SAN FRANCISCO, CALIFORNIA, ASSIGNOR OF ONE-HALF TO HARRY E. WETZEL, OF OAKLAND, CALIFORNIA.

INTERNAL-COMBUSTION ENGINE.

Application filed February 20, 1922. Serial No. 537,997.

*To all whom it may concern:*

Be it known that I, EDWARD L. LOWE, a citizen of the United States, and resident of San Francisco, county of San Francisco, and State of California, have invented a new and useful Internal-Combustion Engine, of which the following is a specification.

The present invention relates to internal combustion engines generally and more particularly to a device associated with an engine of this character for forming the charge, admitting the same into the combustion chamber and assisting in the process of ignition. The principal object of my invention is to provide an internal combustion engine that can be successfully run on any fuel oil, from a highly refined gasoline down to the lowest grade of crude oil, without needing any adjustment whatsoever. A further object is to provide an engine of the character described, in which the charge is ignited without the aid of a spark or a similar igniting means but merely by heat created by compression. A further object is to provide means cooperating with the compressing means for allowing the charge to be ignited under comparatively low pressure. If, for instance, the internal combustion engine of the Diesel type requires a pressure of about 500 pounds, my engine will run on an average pressure of 125 pounds, and I have actually run the engine on a pressure as low as 60 pounds. A further object of my invention is to provide an engine the speed of which is regulated absolutely by the amount of fuel admitted, all the other elements influencing the speed adapting themselves automatically to the speed controlled by the amount of oil admitted. A further object is to provide an engine of the character described, in which the charge is burnt slowly rather than exploded and in which the ignition of the charge takes place at a comparatively low temperature, which together with the fact that the fuel is fed slowly and consumed as fast as it is fed without necessitating a fuel retainer in close proximity to the engine as for instance in the present day carburetor, practically eliminates all danger of fire.

My device is adapted to be used, with slight variations, with engines of the two-cycle type as well as of the four-cycle type and its principles are of general application.

During my experiments I have developed a number of ways of reducing my invention to practice, but have finally decided on the form illustrated in the drawings as the preferred form and will make the same the basis of my description, although I do not wish to limit my claims to that form. In the drawings Figure 1 is a cross-section of my device, shown in connection with a conventional type of a four-stroke internal combustion engine, while Figure 2 shows the same device at a smaller scale and in side elevation in connection with a two-stroke internal combustion engine.

Referring to the four-stroke engine at first and confining my remarks to the same, it will be seen that for my illustration I have selected the vertical type of cylinder. I have made experiments, however, with the horizontal type and attained similar results. The engine 1 is, apart from my device, constructed in the conventional way, it has the cylinder 2, in which the piston 3 reciprocates, the air intake valve 4 and the exhaust valve 6, but it has no spark plug. My device is inserted in the top or head of the cylinder casing and for this purpose a perforation 7 is provided in the top, the diameter of the perforation being enlarged near its upper end so as to provide the shoulder 8. My device is secured into the engine head by means of the coupling 11 which fits on the shoulder 8 and has a collar 12 resting on the top of the cylinder head, a clamp 14 having a shoulder 16 engaging the collar 12 and binding the same firmly to the cylinder head when screwed into the internally threaded sleeve 17, forming an integral portion of the cylinder head. From the coupling extends downwardly, through the perforation 7, but not touching the same, a sleeve 18, which I shall hereinafter briefly refer to as the outer sleeve. The perforation should have a certain depth to establish suitable working conditions and the outer sleeve 18 should bear a certain relation to the depth of the perforation, although it may vary to some extent. The length indicated in the drawing in which the sleeve extends slightly below the bottom of the perforation has been found to give good results, although I have obtained satisfactory results from a sleeve about twice the length and extending far into the cylinder proper, provided other conditions were changed correspondingly, while the results were less satisfactory when I shortened the sleeve considerably, as for instance to one-half the length of that shown in the drawing.

The bottom of the sleeve is shown in the drawing as provided with a deflecting plate 21, and lateral perforations 22 are shown above the plate so as to allow the contents of the sleeve to enter the cylinder proper. The deflecting plate, although desirable, does not seem to be absolutely necessary, since I have successfully run the engine without any deflecting plate and simply an open bottom. The coupling 11 also supports the inner sleeve 23 which is removably held therein by means of shoulders 24 engaging collars 26 extending internally. The inner sleeve, which is arranged, in the example selected, co-axially with the outer sleeve, is proportioned so as to leave a tubular passage 27 between the two sleeves, which for the sake of convenience I shall call the ignition chamber 27 as contra-distinguished from the space 28 enclosed by the inner sleeve which will be referred to as the combustion chamber. I have made a number of experiments, to establish the best proportions as to the length of the inner sleeve and am inclined to believe that a certain proportion should be maintained between the distance of the two bottom ends from each other and the total lengths of the two sleeves. Thus I have found that for the respective lengths of sleeves shown in the drawing the distance indicated between the two bottoms is satisfactory, whereas, if the length of the outer sleeve is doubled, the arrangement seems to give more satisfactory results if the inner sleeve is extended only sufficiently far to double the distance between the two bottom ends. The inner sleeve 23 is provided, near its top, with a plurality of small perforations 29 opening into the tubular ignition chamber 27.

The coupling 11, the upper end of which is internally threaded, receives the plug 31, which contains the mixing chamber 32, into which fuel oil is admitted through the passage 33, controlled by the valve 34, and the spiral passage 36 leading around the plug in several spiral windings and serving as a preheater, while air is admitted through the port 37, and its supply controlled by the valve 38. The latter is seated in the valve cage 39 and held in its seat by the spring 41 bearing against a shoulder 42 of the cage and a collar 43 on the valve. A cap 44 screwed into the plug as shown at 46 encloses the valve cage and is provided with a vent 47. A tubular passage 48 ending into the nozzle 49 connects the mixing chamber 32 with the combustion chamber 28. It will be noted from the drawing that the end of the nozzle extends a slight distance below the perforations 29 which seems to give the best results.

Before proceeding to a description of the different steps involved in the operation of my engine, I wish to state that my explanation of the operation of the engine is based on the observation of effects and after-effects, and present conclusions only.

To begin with the four stroke engine, pure air is drawn into the cylinder during the intake stroke through the intake valve 4. Simultaneously a small amount of pure air is drawn into the combustion chamber through the passage 37 and cleans out the combustion and ignition chambers. During the latter part of the intake stroke fuel oil coming through the passage 33 mixes with the pure air in the mixing chamber and enters the combustion chamber in the form of atomized spray through the nozzle 49. Just how far this partially carburetted charge penetrates into the cylinder I have not established, but probably the larger part of the charge remains in the combustion chamber 28, some of it probably entering the ignition chamber 27. Thus the beginning of the compression stroke finds the main part of the cylinder filled substantially with pure air, while the combustion and ignition chambers, and possibly a small portion of the cylinder adjacent to the same, are filled with carburetted charge. During the compression stroke it seems that the charge divides itself, the lighter gases being forced away farther from the source of compression, that is, the piston, than the heavier particles or gases; and, at the end of the compression stroke, we find, if my theory is correct, the lighter gases grouped in the upper portions of the combustion and ignition chambers, that is, around the nozzle 49, and it is probable that the gas in the ignition chamber 27 has risen to a higher temperature than the gas in the combustion chamber, owing to the fact that it is separated into a thin film, subject to increased friction and heat with greater surface area exposure, and enclosed between two cylindrical walls which naturally retain some of the heat created by previous strokes. At or near the end of the upward or compression stroke, which as stated hereinabove, needs to create moderate pressure only, 125 pounds being considered the average and 60 pounds having been found sufficient, ignition takes place, from all appearances, right in the vicinity of the perforations 29; for I find that after being used the metal surrounding the perforations shows signs of having been subjected to intense heat. It seems that the fire thus started spreads more quickly over the tubular chamber 27, called the ignition chamber, than over the combustion chamber 28, and arrives at the lower end of the tube 23 in time to get ahead of the heavier particles or gases in the lower portion of the combustion chamber 28, or fire thereof, which are simultaneously, but more slowly, driven out of the combustion chamber 28 under the influence of the expanding lighter gases ignited at the top of the combustion chamber at the end of the compression stroke, so that practically speaking, the heavier particles or other gases in the combustion chamber are, at the mouths of the tubes, driven under pressure through a screen of fire created by igniting the lighter or other more highly compressed gases in the ignition chamber and speeding them through the ignition chamber. After passing through the fire screen, they enter the cylinder proper, mix with the hot air therein and become thoroughly consumed, at the same time driving the piston.

The exhaust stroke does not seem to involve any novel features.

In Figure 2 my device is shown in connection with a two stroke, internal combustion engine. As will be seen from the drawing, this modification requires very slight changes only, conditioned by the constructional features of the engine. In the engine shown for the purposes of illustration the exhaust 51 is shown as being slightly above the intake 52, and a tube 53 connects the engine crank casing with the intake, the engine casing receiving its air through the port 54. My device is secured in the cylinder head and its air port is connected with the tube 53 by means of the pipe 56 controlled by the valve 57.

In operation the piston, on its downward stroke, first clears the exhaust port and allows the products of combustion to escape. During its downward stroke pressure is created in the crank case, into which air is admitted through the port 54, and this pressure is communicated to the passages 53 and 56. The exhaust reduces the pressure in the cylinder to neutral before the intake in opened, and thus there is a brief space of time during which a charge is drawn through my device into the combustion chamber. As the piston proceeds downwardly, the intake valve 52 is cleared and pure air enters through the same, while simultaneously a charge enters through my device, when the situation becomes the same as in the four stroke engine, at the beginning of the compression stroke.

I claim:

1. In a device of the character stated, a burner composed of an outer sleeve, and an inner sleeve positioned within said outer sleeve, whereby an outer ignition chamber is formed between said sleeves open at its bottom, and a relatively large combustion chamber is formed within said inner sleeve, said ignition chamber and combustion chamber being in communication at their upper and lower portions.

2. In a device of the character stated, a burner composed of an outer sleeve, and an inner sleeve of less length than said outer sleeve positioned within said outer sleeve, whereby a relatively thin outer annular ignition chamber open at its bottom is formed between said sleeves, and a relatively large central combustion chamber is formed within said inner sleeve, the latter having ports at its upper portion forming a communication between the upper portions of said chambers.

3. In a device of the character stated, a burner composed of an outer sleeve, and an inner sleeve positioned within said outer sleeve, and having its lower end terminating above the bottom of said outer sleeve, whereby a relatively thin annular ignition chamber open at its bottom is formed between said sleeves, and a relatively large central combustion chamber is formed within said inner sleeve, the latter having ports at its upper portion forming a communication between the upper portions of said chambers, and a fuel supply nozzle discharging fuel into said combustion chamber at a point in proximity to said ports.

4. In an insertible burner for internal combustion engines, an elongated central combustion chamber and an elongated surrounding relatively thin ignition chamber communicating therewith through restricted ports near its upper end, the remaining portion of said elongated ignition chamber being cut off from said combustion chamber, but communicating therewith at its lower end.

5. A burner for engines of the slow combustion type, comprising a plurality of approximately concentric sleeves separated from each other by an outer air space forming an ignition chamber opening into the compression space of the engine and a central combustion chamber formed within the inner sleeve and opening into said compression space and having restricted communication with said ignition chamber near one end, the opposite ends of said chambers communicating.

6. An insertible burner for internal combustion engines, comprising a plurality of interfitted sleeves, one within the other, and separated from each other by an outer elongated air space forming a relatively thin ignition chamber, the inner sleeve containing the combustion chamber and having small ports near its outer end, said burner being adapted to be mounted in the wall of an engine cylinder, and said combustion chamber and ignition chamber communicating at their lower ends and opening into the compression space of said cylinder, said chambers being non-communicating throughout their length, and a support for said sleeves adapted to be secured to said cylinder.

EDWARD L. LOWE.